INVENTOR.
Hubert J. Parsons
William A. Kilmer
Anders A. Peterson
and William D. Connors
BY *Parker & Rochnor*
ATTORNEYS.

United States Patent Office 3,165,769
Patented Jan. 19, 1965

3,165,769
THREADING ATTACHMENT PIVOTALLY AND SLIDABLY MOUNTED ADJACENT THE LATHE SPINDLE
Hubert J. Parsons, Horseheads, William A. Kilmer and Anders A. Peterson, Elmira, and William D. Connors, Horseheads, N.Y., assignors to Hardinge Brothers, Inc., Elmira, N.Y.
Filed Dec. 21, 1961, Ser. No. 161,066
13 Claims. (Cl. 10—101)

This invention relates to automatic thread cutting mechanisms of the type which includes a lead screw and follower which control the action of a cutting tool on the work.

Heretofore the feeding of the tool to the work and the advancing of the tool toward the work to increase the depth of cut were controlled manually, which required skill on the part of the operator and also a considerable amount of physical exertion.

It is an object of this invention to provide mechanism by means of which the several operations in the cutting of threads of this type are carried on automatically, thus relieving the operator of fatigue and increasing the production of work.

Another object is to provide a mechanism which is not dependent on the skill of the operator to produce uniform and accurate results.

It is also an object of this invention to provide a thread cutting or chasing mechanism which when started can effect the cutting of the screw thread with the predetermined number of passes without requiring any attention by the operator and which automatically stops when the cutting of the thread is completed.

Another object is to provide a mechanism of this type which is readily adjustable to cut a large variety of different screw threads.

In the accompanying drawings which illustrate by way of example one embodiment of our invention.

Our automatic threading attachment may be applied to any suitable lathe having a headstock 25 in which the usual spindle is suitably journalled and rotated by driving mechanism, not shown. The spindle is provided at one end thereof with a lead screw 27 and the other end is provided with a collet or chuck 28 for holding the workpiece 29 which is to be threaded by means of a suitable cutting tool 30. There is also provided an arm or handle 31 at one end of the headstock which has a follower 32 of any usual type formed to cooperate with the threads of the lead screw 27 when the handle is swung downwardly to mesh the follower with the lead screw. The follower in the construction illustrated has its peripheral portion scalloped at four places, as indicated at 33, and provided in the scalloped portions with threads to fit the lead screw, the follower being releasably mounted on the arm 31 so that any one of the scalloped portions may be placed into position to cooperate with the lead screw.

The arm or handle is secured to a bar 34 which extends parallel to the spindle of the lathe and is mounted in a housing 35, the bar being of hollow, tubular form. The bar is journalled to be turned about its axis and also to move lengthwise of the housing 35, for example, by means of rectilinear bearings 36 mounted within hardened bushings 37 and retainers and engaging the bar 34, FIG. 8.

The bar 34 may be supported on any desired portion of the headstock 25, being shown in the construction illustrated as arranged laterally on one side of the spindle, at the same elevation of the spindle. However, it is intended that this threading mechanism may be mounted on the headstock in such a manner as not to interfere with any of the usual functions of the lathe to which it is applied. Consequently the bar 34 may be mounted at a somewhat higher elevation than shown in the drawings in order to avoid interference with a turret or other lathe part when the threading mechanism is not in use.

Figure 1:
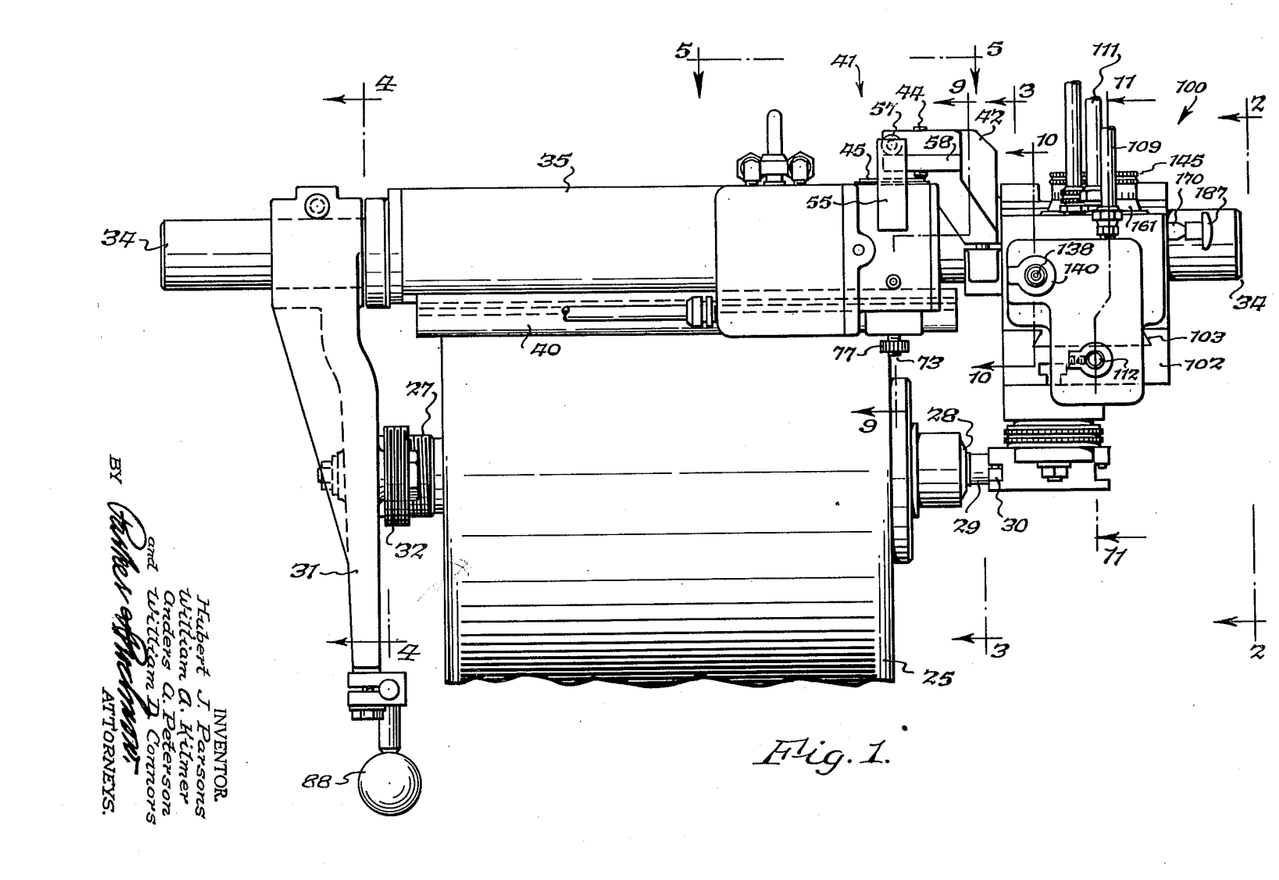
FIG. 1 is a top plan view of a portion of the headstock of a lathe having applied thereto an automatic thread-cutting machine embodying this invention.
Figures 2, 3, 4:
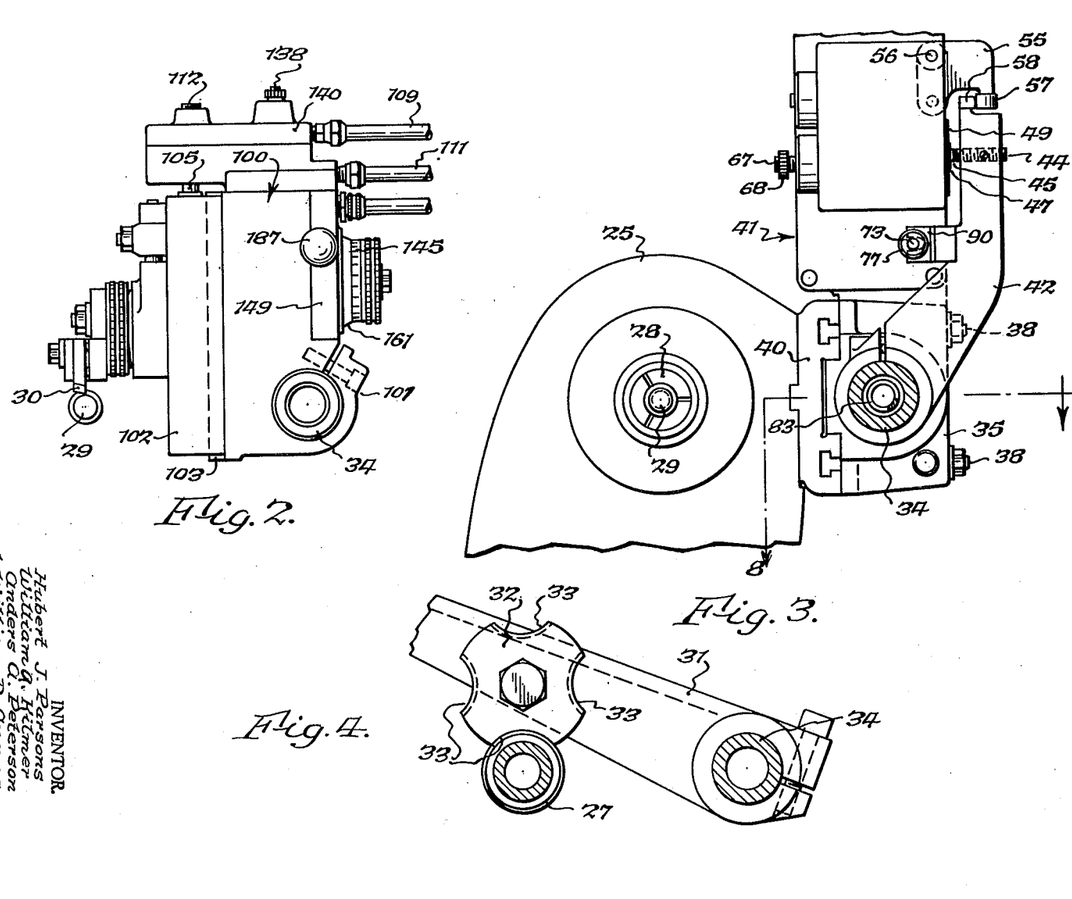
FIG. 2 is an end elevation thereof as seen from line 2—2, FIG. 1.
FIG. 3 is a fragmentary, transverse sectional elevation thereof on line 3—3, FIG. 1.
FIG. 4 is a fragmentary, sectional elevation thereof taken approximately on line 4—4, FIG. 1 and showing the handle and lead screw follower of the mechanism.

The housing 35 is slidably mounted on the headstock in any desired manner, either directly or through the medium of a mounting plate 40. The T-bolts 38 slidably mount the housing on the headstock 25 of the lathe, see particularly FIG. 3, in which the bar 34 is located directly at one side of the lead screw. However, as before stated, the mounting plate 40 may be attached to the headstock in any convenient relation thereto, for example, somewhat higher than shown in FIG. 3, if such other position is found necessary to avoid interference with other parts of the lathe. This arrangement permits the entire threading attachment to be moved parallel to the axis of the spindle into different positions to allow threads to be cut on the workpiece farther in or out from the headstock of the lathe. If longer threads are wanted, the attachment is moved to the right in FIG. 1 by adjusting the arm or handle 31 on the bar 34 to the left of the position shown in FIG. 1 so that the follower may be moved into engagement with the lead screw while the bar and its housing are moved to the right. The housing will therefore be moved with the bar 34 into operative relation to the workpiece when the same is at a distance from the headstock, which has the advantage of providing a better support for the cutting tool than the prior constructions in which the bar was moved out of the housing while the housing remained fixed. The housing has rigidly mounted thereon an upwardly extending housing part 41.

Figure 7:
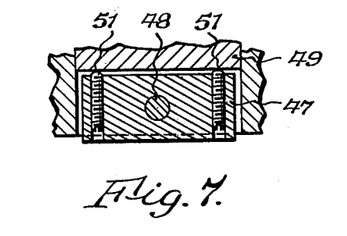

The extent to which the cutting tool is moved lengthwise of the work is controlled by means of mechanism on the housing part 41 through an arm 42 which is secured to the bar 34 and extends upwardly therefrom into engagement with a part of the mechanism on the housing part 41. The swinging and movement of the arm 42 controls the movement of the bar 34 and the movement of the cutting tool toward the work. The swinging movement of the arm 42 is controlled by means of a screw 44 mounted on the arm in position to engage a hard plate 45 which, for example, may be of a cemented carbide material. This plate is mounted on a supporting block 47 which is pivotally mounted on a pivot pin or rod 48, FIGS. 7 and 9, and which is connected to a block 49 having an extension which engages the head of a piston 50. The supporting block on which the carbide plate is mounted may be adjusted relatively to the block 49 at the end of the piston 50, for example, by means of screws 51 by means of which the angularity of the supporting block 47 may be controlled so that, for example, the threads may be cut on the workpiece straight and equidistant from the axis of the workpiece, or the supporting block, or may be arranged angularly with reference to the piston head 50 so that the thread cut on the workpiece may be tapered, in which case the lead screw and follower must be correspondingly altered, usually to a buttress thread form. A pin 52 connects the block 49 and a fixed part of the mechanism to hold this block from turning while allowing axial motion.

Figure 9:
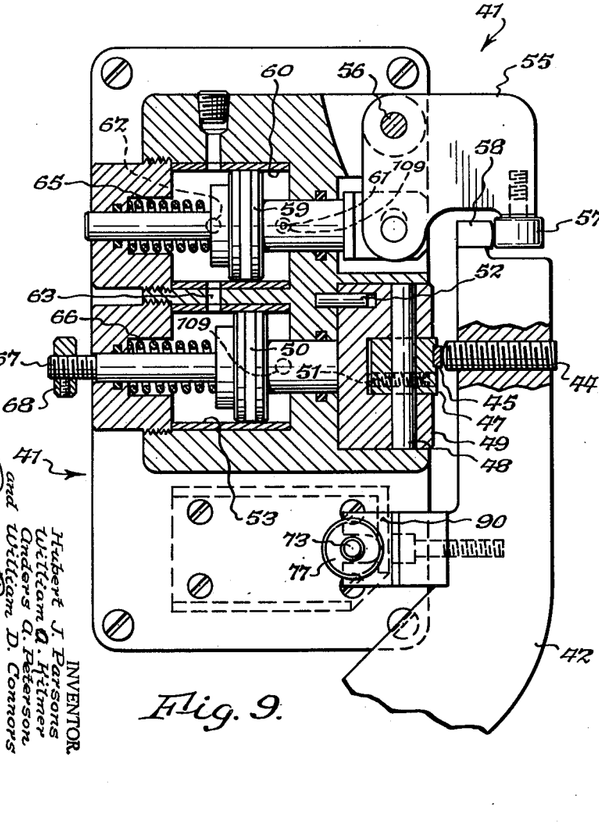
FIGS. 9 and 10 are transverse sectional elevations thereof on lines 9—9 and 10—10 respectively, FIG. 1.

The piston 50 reciprocates in a cylinder 53 which controls the position of the carbide block and the arm 42 so that this arm is swung to the right in FIG. 9 to turn the bar 34.

We also preferably provide on the housing part 41 a clamp 55 pivoted at 56 on the housing part 41 and having a roller 57 on the outer end thereof which is formed to engage a rail 58 of the arm 42. This roller maintains clamping pressure on the arm 42 during its movement with the bar 34 to effect a pass of the cutting tool. The clamp may be swung about its pivotal connection 56 by means of a piston 59 contained in a cylinder 60. This clamp holds the arm 42 in the position in which it is set by means of the screw 44 engaging the carbide strip 45 to hold this arm and the bar 34 from swinging and thereby resist the tendency of the cutting tool to lift or move away from the work piece under pressure of the cut. This lifting out of the cutting tool was heretofore prevented by pressure of the operator acting on the handle or arm of the mechanism. Consequently by means of this clamp the fatigue of the operator from this source is eliminated and more uniform cutting of the thread results.

The two cylinders 53 and 60 may be arranged side by side, as shown in FIG. 9. After a cut has been completed on the workpiece, it is necessary to swing the arm 42 outwardly from the housing part 41, which results in swinging the arm or handle 31 upwardly to move the follower out of engagement with the lead screw. This is done by admitting air under pressure into the head ends of the cylinders 53 and 60. Air, for example, may be admitted through a port 62 into the cylinder 60 to move the clamping member 55 out of engagement with the arm 42. A passage 63 connects the cylinder 60 with the cylinder 53 so that its piston moves the block 49 outwardly while the clamp is releasing the arm 42. This results in the outward swinging of the arm 42 and the turning of the bar 34 and the arm or handle 31 connected therewith which in turn results in the disengagement of the follower with the lead screw 27 and the cutting tool from the workpiece. Both of these cylinders are provided with springs 65 and 66 so that the arm 42 will be moved into disengaging position even in the event of failure of the supply of compressed air. The piston 50 is also provided with an extension or rod 67 extending through the head of the cylinder 53 and provided with screw threads at its outer end which cooperate with a stop nut 68 to limit the extent to which the piston 50 may be swung outwardly by the air pressure or by the spring 66. When the arm 42 is swung back toward its operative position by mechanism hereinatfer to be explained, the piston 50 will have moved backwardly to permit the arm 42 to return to its original position and the clamp will then secure the arm 42 in clamped position after the follower has engaged the lead screw and the cutting tool is ready to make a new cut. In reclamping the arm 42, air is admitted to the rod end of the piston in the cylinder 60 slightly after the arm 42 has been moved back into its operative position for the purpose of permitting the follower to move into correct relation to the lead screw before the arm 42 is secured in place by means of the clamping member 55. The delay in admitting motive fluid to the cylinder 60 may be effected in any usual or suitable manner, but in the construction shown, is accomplished by a restricted orifice 61 by which air is admitted to this cylinder.

Figure 6:
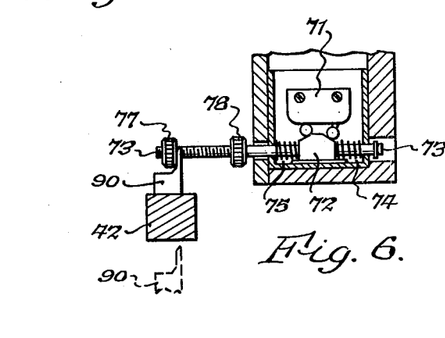
FIGS. 6 and 7 are fragmentary, sectional plan views thereof on lines 6—6 and 7—7 respectively, FIG. 5.

Air is admitted to the cylinder 60 and 53 by means of an electrically operated air valve 70 which is actuated by means of limit switches arranged in a housing 71, FIG. 6. Since air valves and limit switches are well known and may be purchased on the open market, further description of the same herein is not believed necessary. The limit switches are tripped by means of a block 72 mounted on a reciprocatory rod 73 which is held in neutral position by means of springs 74 and 75 which are such as to normally retain the block 72 in a neutral center position in which neither of the limit switches is actuated. When the rod is moved in either direction from the neutral position, one or the other of the limit switches is tripped to close a circuit.

Figure 8:
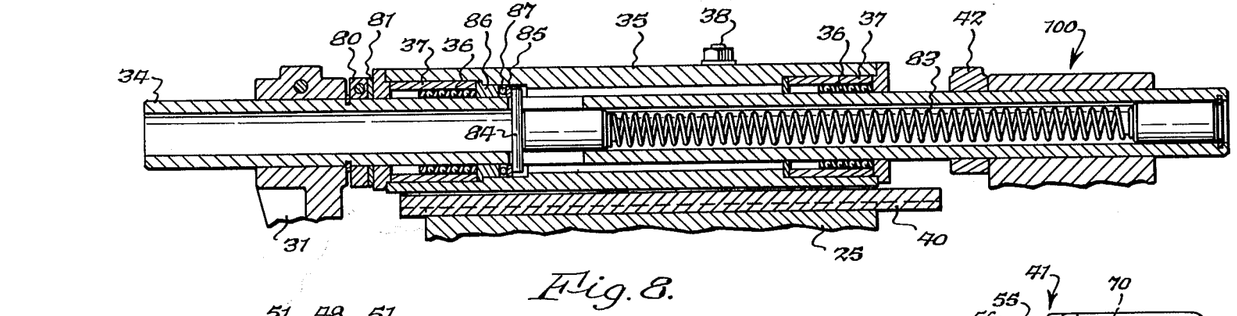
FIG. 8 is a sectional plan view thereof on an enlarged scale on line 8—8, FIG. 3.

The rod 73 is controlled by means of a pair of collars 77 and 78, the collar 77 being fixed on the rod so as to trip its switch just before a stop collar 80 and bumper washer 81 on the bar 34 are against the end of the housing cap in the position shown in FIG. 8. The other collar 78 is adjustable along the rod 73 to control the length of the thread to be cut. The bar 34 may be normally held in the position shown in FIG. 8 by a spring 83 reacting against a pin 84, washers 85 and 86 and thrust bearing 87.

Attached to the arm 42 is a trip block 90, the end of which is bifurcated and straddles the rod 73 so that it can move out of engagement with the rod 73, as shown in broken lines in FIG. 6, when the arm 42 is swung backwardly into its parked or inoperative position, in which this arm rests against a rod 91. The face of the bifurcated end of the trip block 90 adjacent to the collar 77 is preferably slightly bevelled so that when the arm 42 moves back into its operative position, as shown in FIG. 6, the bevelled face pushes the collar and rod 73 slightly to the left in FIG. 6 to actuate the switch.

The operation of the mechanism thus far described is as follows:

To start the mechanism, the part carrying the cutting tool 30 is swung toward the work and the trip block 90 engages the collar 77, thus drawing the rod 73 to the left in FIG. 6, which actuates the limit switch and providing switch 135, to be described later is closed, will cause the electrically controlled valve 70 to admit air to the piston rod ends of both cylinders 60 and 53. This permits the arm or handle 31 to move toward its operative position so that the follower 32 moves into engagement with the revolving lead screw 27, thus starting axial motion of the bar 34. The clamp 55 then moves into clamping position with the arm 42 and linear motion of the bar 34 and arm 42 continues until the trip block 90 engages the collar 78, thus moving the rod 73 to the right in FIG. 6, to actuate the other limit switch which, through the electric air valve 70, discharges air from the piston rod ends of the cylinders and admits air to the opposite ends of the cylinders, whereupon the clamp 55 releases the arm 42 and this arm is pushed out by the piston in the cylinder 53. This causes the follower 32 to move out of engagement with the lead screw 27 and also withdraws the tool from the work. The spring 83 consequently pushes the entire unit back to its starting position which results in the trip block 90 engaging the collar 72 and pushing the rod 73 to the left in FIG. 6 and the air is again valved into the piston rod end of the cylinder 53 which permits arm 42 to return to the position shown in FIG. 9. The weight of the unit, including that of the ball or hand grip 88 on the end of the handle 31, is forwardly of the axis of the bar 34, which causes the handle and the follower to move downwardly to permit the follower to find its correct position in the rotating lead screw, after which the delayed air build-up to the cylinder 60 moves the clamping member into engagement with the arm 42. These repeated automatic motions continue step by step until the thread is completed.

Figure 5:
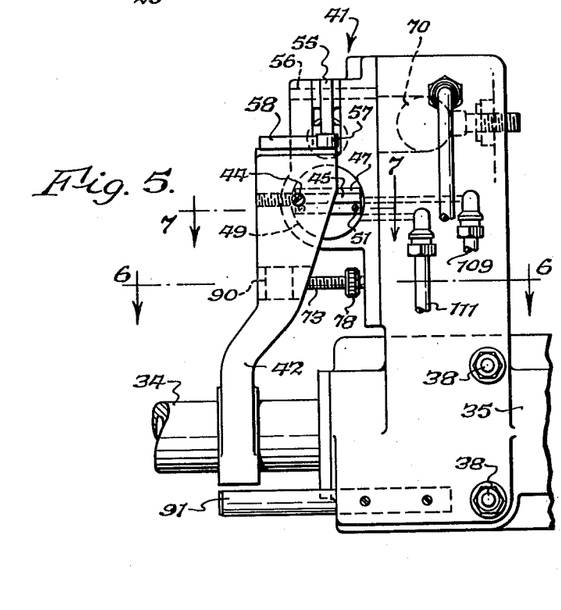
FIG. 5 is a fragmentary elevation thereof as seen from line 5—5, FIG. 1.

When the thread cutting operation is completed, the thread cutting mechanism can be swung backwardly into a parked position so that the arm 42 rests upon stop rod 91, see FIG. 5, whereupon the mechanism will not interfere with the regular use of the lathe. This makes it possible to do the threading and other operations on a workpiece without removing the same from the spindle which results in highly accurate concentricities on the workpiece of the threads with relation to other machined surfaces.

Cut-deepening mechanism

The mechanism thus far described moves the cutting tool repeatedly lengthwise of the workpiece. The means for successively advancing the cutting tool toward the workpiece to increase the depth of the cut after each pass is effected by means of mechanism mounted on a chasing head 100 which is also mounted on the bar 34 for movement therewith, for example, by means of a clamp 101 engageable with the bar 34. The chasing head also has mounted thereon a slide 102 having the tool holder and the cutting tool 30 mounted thereon. This slide is movable vertically in the particular construction shown relatively to the chasing head, the slide and chasing head being connected by means of a dovetailed slide connection 103.

The slide 102 is moved vertically along the slide connection 103 by means of a pneumatic mechanism including a piston 105 mounted to reciprocate in a cylinder 106 formed in a part of the chasing head 100. Air may be admitted to the head of the cylinder 106 through a passage 108 from an air conduit 109 and compressed air is admitted to the piston rod end of the cylinder 106 by means of a similar passage 110 to which the air is admitted by a conduit 111. The upward limit of movement of the piston 105 is controlled by means of a stop screw 112 which is adjustable to vary the upward movement of the piston. When cutting small internal threads of fine pitches, this stop screw is adjusted to prevent excessive upward travel of the slide 102, such as might result in having the back of the cutting tool contact the hole in the workpiece in which the internal threads are being cut.

The movement of the slide toward the work is controlled by means of a cam 115 mounted on the chasing head 100 and cooperating with a pin 116 mounted on the slide 102. Consequently the slide is moved downwardly in the construction shown in FIG. 11 until the pin 116 rests against the peripheral face of the cam 115.

Figures 11, 12, 13:
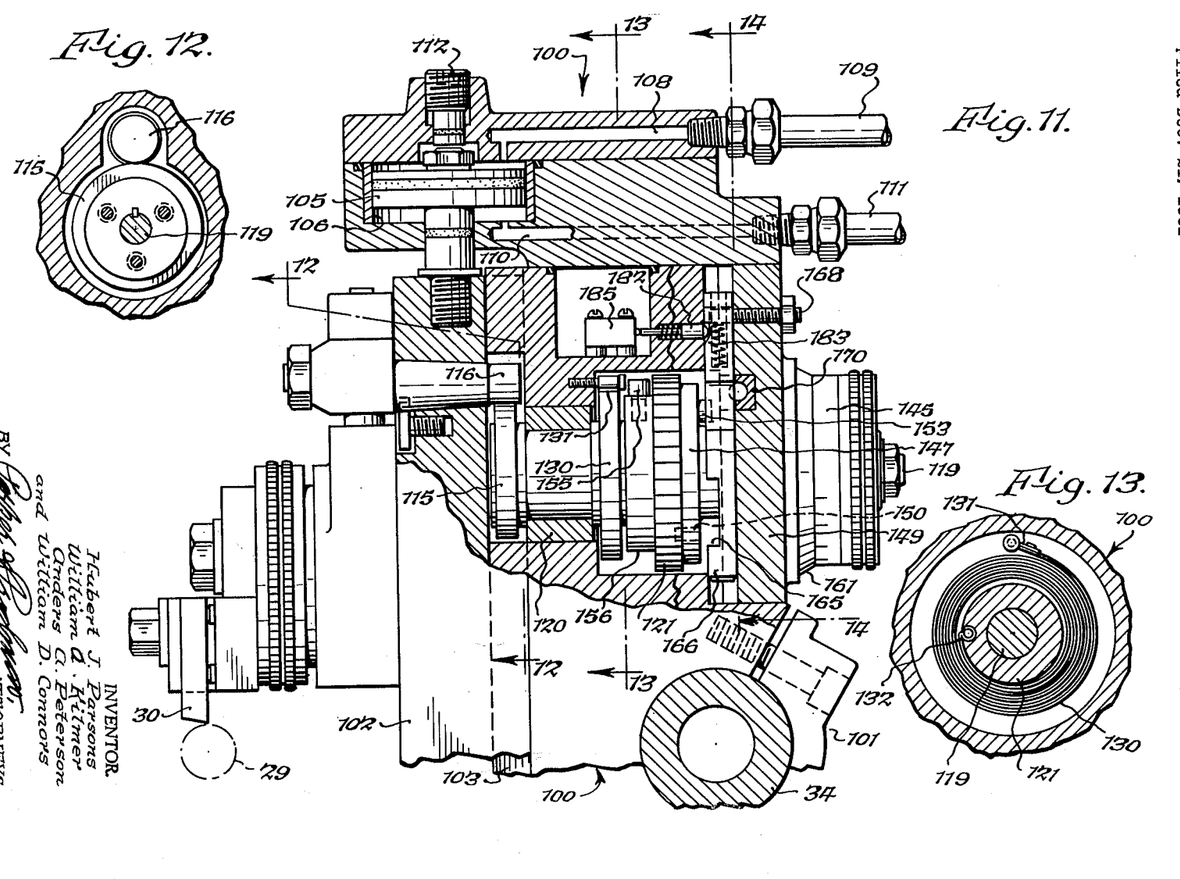
FIG. 11 is a transverse, sectional elevation thereof on an enlarged scale on line 11—11, FIG. 1.
FIG. 12 is a fragmentary, sectional elevation thereof on lines 12—12, FIG. 11.
FIGS. 13 and 14 are transverse, sectional elevations thereof on lines 13—13 and 14—14 respectively, FIG. 11.

The cam as clearly shown in FIG. 12 is rotatable so that after each increment of movement of the cam the pin 116 will move to a slightly greater extent downwardly and thus move the cutting tool farther into the work to produce a deeper cut.

Figure 10:
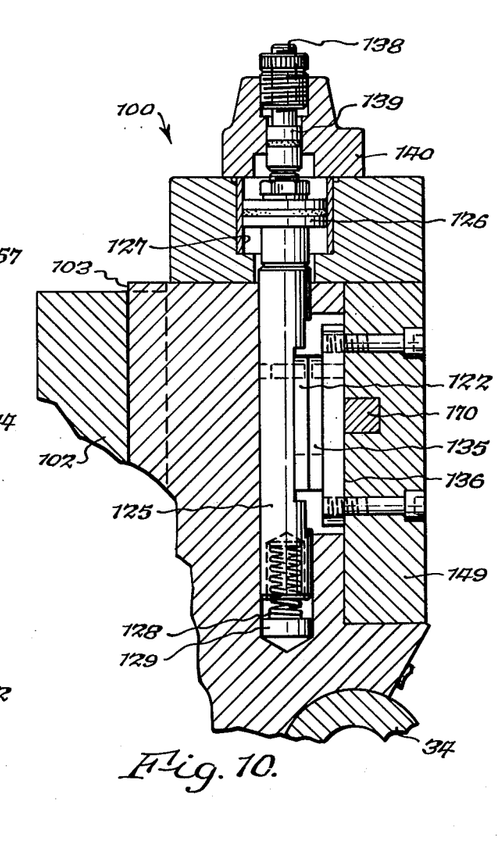

The cam is mounted on a shaft 119 journalled in a bearing 120. Also mounted on this shaft is a ratchet wheel 121 having teeth which cooperate with a pawl 122 urged by means of a spring 124 into engagement with the teeth of the ratchet wheel. This spring, in the construction shown, is formed integral with the pawl and bears against the back wall of a recess in the chasing head in which the pawl moves. This pawl is mounted on a slidable member or push rod 125 actuated by a piston 126 reciprocable in a cylinder 127 also formed in a part of the chasing head 100. The rod 125 is recessed at one side thereof as shown in FIG. 10, and the pawl 122 extends into this recess in position to engage the teeth of the ratchet wheel 121. Consequently, when compressed fluid is admitted into the cylinder 127, the piston 126 will move downwardly carrying with it the pawl 122. The extent of this downward movement is controlled by a plug 129 which is of such thickness as to stop the downward movement so as to provide proper limited movement of the pawl 122. A spring 128 acting on the lower end of the slidable member 125 returns the piston upwardly when the air pressure in the cylinder 127 is relieved. Consequently at each downward movement of the pawl 122, the ratchet wheel is turned and this turning motion is imparted to the cam 115, thus bringing the portion of the cam of smaller radius under the pin 116, with the result that the tool 30 is moved to cut farther into the workpiece.

The ratchet wheel is turned by the pawl against the action of a return spring 130 which may be in the form of a clock spring, FIG. 13, having one end 131 secured to a fixed part of the chasing head and the other end 132 secured to the hub of the ratchet wheel. This spring is wound up by the action of the pawl 122.

There is also provided a holding pawl 135 which may be identical in construction to the pawl 122 and mounted on a block 136 which is secured to a cover member or removable side wall 149 secured to the chasing head. This pawl engages a tooth of the ratchet wheel after it has been advanced and prevents the spring 130 from back rotating the cam and ratchet wheel when the moving pawl 122 retracts from engagement with the ratchet wheel. A screw 138 limits the upward movement of the pawl actuating piston 126, and this screw is preferably adjustable to two different positions so that the pawl actuating piston 126 may move the ratchet wheel to the extent of one tooth or two teeth at a time for slower or faster feeds which can be used for cutting materials of varying hardness, such as aluminum or steel. This screw has an extension 139 having an air-tight connection with the head 140 of the cylinder 127 and extending into position to be contacted by an extension of the upper end of the piston 126, FIG. 10.

Figures 14, 15, 16, 17, 18:
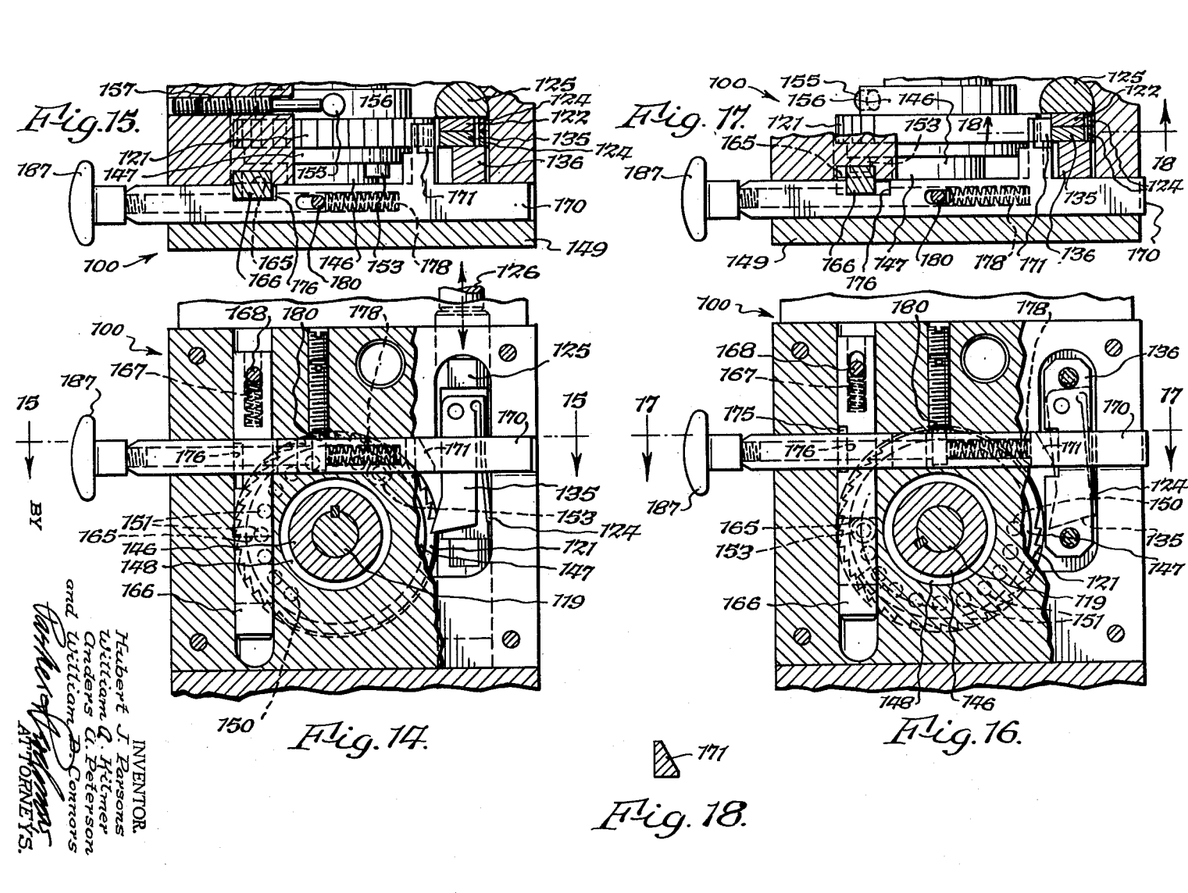
FIG. 15 is a sectional plan view thereof on line 15—15, FIG. 14.
FIG. 16 is a section similar to that shown in FIG. 14, but showing some of the parts in different positions.
FIG. 17 is a sectional plan view thereof on line 17—17, FIG. 16.
FIG. 18 is a fragmentary section on line 18—18, FIG. 17.
Figures 19, 20:
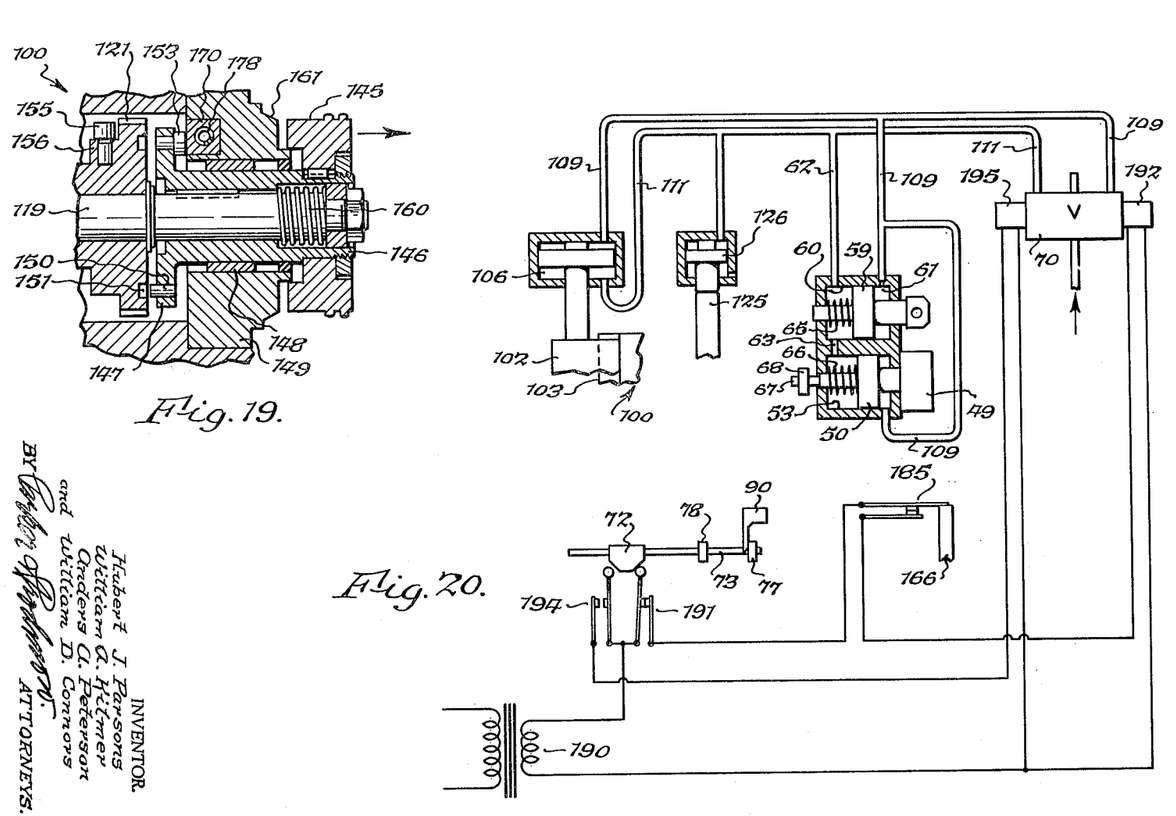
FIG. 19 is a fragmentary, sectional view of the parts for adjusting the mechanism for depth of thread to be cut.
FIG. 20 is a diagrammatic view showing the electrical and pneumatic connections for actuating our improved mechanism.

In order to control the depth of cut in the workpiece, or in other words, the number of passes to be made by the cutting tool, a dial 145 is provided which is mounted on one end of a sleeve 146, FIG. 19, having a flange or enlargement 147 at the inner end thereof. This sleeve is supported on a bearing 148 arranged in the cover member 149 on the chasing head 100. The flange 147 is provided with a pin 150 formed to extend outwardly from one face of this flange and which may be placed into any one of a number of holes 151 formed in the ratchet wheel 121. The flange 147 is also provided with a shutoff pin 153 extending outwardly from the other face of this flange and which controls the shutting off of all actions of the thread chasing mechanism, after the desired number of passes of the cutting tool are completed. The positions of the parts when thus stopped are shown in FIG. 16, and FIG. 14 shows the positions of the parts at the start of a threading operation. The operation of the threading mechanism is stopped when a stop pin 155 on the hub 156 of the ratchet wheel engages a stop screw 157. In this position the cam 115 is in the highest rise position. The stop screw 157 is adjustable to position the same to stop the mechanism correctly in the stop position. The operator can then place a new workpiece to be similarly threaded in the chuck on the spindle. If, however, it is desired to cut a different thread on a workpiece, this can easily be accomplished as follows:

By pulling the dial 145 outwardly against the action of a spring 160, the pin 150 is pulled out of its hole in the ratchet wheel and the dial can then be rotated to set the mechanism to a new depth of cut indicated by the graduations on the dial and a zero line on the corresponding part 161 of the cover member 149. After the dial has been set into the desired position, it is released and the spring 169 will then push the pin into a new hole in the ratchet wheel. This results in a change in the angular relation of the shutoff pin 153 to the normal position of the shaft 119 so that the threading cycle stops after a different number of passes and a correspondingly different amount of the feed down of the cutting tool 30.

After the pawl 122 has advanced the ratchet wheel to the extent for which the setting of the pin 150 in a hole 151 of the ratchet wheel provides, the shutoff pin 153 will have advanced into a recess 165 in a vertical bar 166 slidable in an aperture provided for the same in the chasing head 100. This bar is then raised by the shutoff pin 153 against a spring 167 provided in a bore in the end of the bar 166 and acting against a stationary pin 168. The upright bar 166 interlocks with a horizontal bar 170 in such a manner as to hold this bar to the left in FIGS. 14 and 15, but this interlocking arrangement is released when the upright bar 166 is raised, and when the horizontal bar 170 is released, a part 171 thereof moves to the right in FIGS. 14–16 and engages the two pawls 122 and 135 so that both of them are moved out of engagement with the teeth of the ratchet wheel. This enables the clock spring 130, which has been wound up by the pawl 122 and held against turning by the pawl 135, to return the ratchet wheel and cam 115 to their starting positions, as shown in FIG. 14.

The connection between the upright bar 166 and the horizontal bar 170 may be of any suitable type, that shown including a notch 175 in the upright bar 166 which registers with a notch 176 in the horizontal bar when the upright bar has been pushed upwardly by the cutoff pin 153. The movement of the horizontal bar into position to disengage the dogs is effected by means of a spring 178 arranged in a bore in the horizontal bar and bearing against a fixed stud 180.

When the ratchet wheel is returned to its starting position by means of the clock spring, as described, the stop pin 155 mounted on the hub of the ratchet wheel stops further rotation of the ratchet wheel and cam and holds them in their starting positions.

The upright bar 166, when raised by the shutoff pin 153, engages a switch actuating pin 182, FIG. 11, with a cam portion 183 of the upright bar and thus pushes this pin 182 against the action of a spring into position to close a switch 185 which shuts off all electric power to the thread-cutting mechanism.

The horizontal pawl releasing bar 170 extends to the exterior of the chasing head 100 and has a knob 187 on the exterior of this head. When it is desired to start the mechanism, the bar 170 is pulled out, thus permitting the upright bar 166 to be moved by its spring 167 into position to interlock with the bar 170. The down movement of the bar 166 permits the switch actuating pin 182 to close the switch 185 and by moving the bar 170 to the left in FIGS. 14–17, the pawls are released so that the mechanism is ready to resume operation. If it is desired to cut an identical thread on another workpiece, no change in the mechanism is necessary. If a different thread is desired, the dial 145 is set for the new depth of thread desired. The position of the stop 78 may be changed if a different length of thread is desired, and a different lead screw and follower may be required.

The operation of the threading mechanism will be further understood by referring to the diagram in FIG. 20 showing the electrical and pneumatic connections which may be employed between the parts of the mechanism. In this diagram the secondary 190 of a transformer is connected with either of the two limit switches in the housing 71. When the switch 191 is closed to start a cycle or pass, because the trip block 90 has moved the rod 73 to the left in FIG. 6 and to the right in FIG. 20, current flows through the closed switch 191 and the switch 185 closed by the down movement of the bar 166 to a solenoid 192 of the electrically operated valve 70 and then back to the other terminal of the transformer secondary. This valve is actuated by the solenoid 192 to admit compressed air to the piston rod ends of the cylinders 60 and 53 through the air lines 109, which results in withdrawing piston head 50 and block 49 to permit the arm 42 to return to the position shown in FIG. 9 and moving the clamp 55 into holding relation to this arm. As before mentioned, the piston 59 of the cylinder 60 moves more slowly to clamp the arm 42 because the restricted orifice 61 retards the air entering the cylinder 60, thereby permitting the piston 50 to move to its left hand position or cutting position before the piston 59 clamps the arm 42. Pressure is also admitted to the head end of the cylinder 106 through the air line 109, thus causing the pin 116 to press against the cam 115.

When a cut has been completed, the trip block 90 engages the adjustable stop 78 at the end of a pass of the cutting tool so that the rod 73 is moved to the left in FIG. 20, thus closing a switch 194 which completes a circuit to a solenoid 195 of the valve 70. This introduces air under pressure into the head ends of cylinders 60 and 53 through the air lines 111 and 62 which releases the clamp 55 and moves the arm 42 outwardly to turn the bar 34 to move the follower out of engagement with the lead screw and raise the cutting tool. Air is also admitted to the cylinder containing the piston 126 thru air line 111 thus advancing ratchet wheel 121 and air is admitted to the piston rod side of the cylinder 106, thus moving the piston 105 to relieve pressure on the pin 116 against the cam 115.

When a threading operation is completed, the upright bar 166 opens the switch 185. However, when the next threading operation is started by pulling out the horizontal bar 170, the upright bar is moved downwardly by spring action so that the switch 185 is again closed to start another thread cutting operation.

It will be understood that various changes in the details, materials and arrangements of parts which have been herein described and illustrated in order to explain the nature of the invention may be made by those skilled in the art within the principle and scope of the invention as expressed in the appended claims.

We claim:

1. A threading attachment for a lathe having a spindle,
   a lead screw mounted on said spindle,
   a bar mounted on said lathe and extending parallel to said spindle,
   a follower connected with said bar and movable into mesh with said lead screw for imparting lengthwise motion to said bar,
   a head secured to said bar,
   a cutting tool mounted on said head,
   means on said head for controlling the depth of cut to be made by said tool, said means including a pneumatically actuated piston for urging said cutting tool to the work, and a cam which controls the extent of movement of said tool by said pneumatic means,
   means controlled by the movement of said tool for rotating said cam, and
   means operable at the completion of a pass of said tool for turning said bar about its axis to move said follower out of engagement with said lead screw and for moving said tool out of engagement with the work.

2. Mechanism according to claim 1,
   in which said means for turning said bar include an adjustable electric circuit-closing device which completes a circuit when said bar has moved the desired distance, and
   a valve provided with means actuated by said circuit when completed for admitting motive fluid to a pneumatic mechanism for turning said bar to move the tool out of engagement with the work.

3. A threading mechanism for attachment to a lathe having
a spindle,
a lead screw connected with said spindle,
a bar mounted on said lathe parallel to said spindle, a follower connected with said bar and movable into mesh with said lead screw for moving said bar in the direction of its length,
a trip block connected with said bar,
a rod having stops mounted thereon for engagement by said trip block,
limit switches closed by said rod at opposite ends of said path of movement,
an electrically operated air valve controlled by one of said switches,
and pneumatic mechanism operated by air received from said valve, for releasing said bar to swing about its axis when a pass by said tool is completed to move the follower from the lead screw.

4. A threading mechanism for attachment to a lathe having a spindle and including
a bar mounted on said lathe parallel to said spindle,
a housing in which said bar is turnable and slidable,
a lead screw connected with said spindle,
a follower connected with said bar and movable into and out of mesh with said lead screw,
spring means against which said bar is moved lengthwise of said housing by said follower, when engaging with said lead screw,
a cutting tool mounted on said bar for engagement with the workpiece,
an arm mounted on said bar and pressed against said housing during a pass of the cutting tool,
and means actuated by said bar to release said arm from said housing when a pass has been completed,
and including a movable clamp for securing said arm in contact with said housing, and pneumatic means for releasing said clamp to move out of securing engagement with said arms when a pass of the cutting tool has been completed.

5. A threading attachment for a lathe having a spindle,
a lead screw mounted on said spindle,
a bar mounted on said lathe and extending parallel to said spindle for rotary and slidable movement,
a follower connected with said bar and movable into mesh with said lead screw for imparting lengthwise motion to said bar,
a head secured to said bar,
a cutting tool mounted on said head, means on said head for controlling the depth of cut to be made by said tool,
said means including a slide on said head on which said cutting tool is mounted,
pneumatic means for urging said slide toward the work to be cut by said tool,
and means operable upon the completion of a pass of said tool for relieving the pressure of said pneumatic means to further withdraw the tool from the work,
and means upon completion of a cutting operation to swing said bar and the head secured thereon into an inoperative position.

6. A threading mechanism for attachment to a lathe having a spindle, said mechanism including
a bar mounted on said lathe and extending a pneumatically actuated piston moving said pawl parallel to said spindle,
a housing in which said bar is turnable and slidable,
mechanism on said housing for controlling the length of movement of said bar lengthwise of the work in accordance with the length of the thread desired,
a head mounted on said bar,
a slide having a cutting tool mounted thereon and movable relatively to said head toward and from said workpiece,
a cam rotatably mounted on said head,
a part on said slide movable into engagement with said cam to control the extent of movement of said tool to the work,
a ratchet wheel rigidly connected with said cam,
a pawl engaging said ratchet wheel and movable for turning said ratchet wheel to present different portions of the cam of successively decreasing radii for engagement by said slide,
and adjusting means for controlling the movement of said pawl relatively to said ratchet wheel for varying the extent to which said ratchet wheel is turned by a single movement of the pawl,
said adjusting means including a screw adjustable to limit the travel of said piston to control the extent of movement of said pawl.

7. A threading mechanism for attachment to a lathe having a spindle, and a headstock, said mechanism including
a bar mounted on said headstock of the lathe and extending parallel to said spindle,
a housing in which said bar is turnable and slidable,
mechanism on said housing for controlling the length of movement of said bar lengthwise of the work in accordance with the length of the thread desired,
an arm mounted on said bar,
a head mounted on said arm,
a slide having a cutting tool mounted thereon and movable relatively to said head toward and from said workpiece,
a cam rotatably mounted on said head,
a part on said slide movable into engagement with said cam,
pneumatic means for moving said slide into and out of engagement with said cam,
adjustable stop means for limiting the extent of movement of said slide in accordance with the depth of cut to be made in a workpiece,
and electric contact means mounted in position to be engaged by said arm for starting and stopping the longitudinal movement of said bar and for swinging said bar to move said head into an inoperative position.

8. A threading mechanism for attachment to a lathe having a spindle, said mechanism including
a bar mounted on said lathe and extending parallel to said spindle,
a housing in which said bar is turnable and slidable,
mechanism on said housing for controlling the length of movement of said bar lengthwise of the work in accordance with the length of the thread desired,
a head mounted on said bar,
a slide having a cutting tool mounted thereon and movable relatively to said head toward and from the workpiece,
means on said head for moving said slide toward the workpiece in accordance with the depth of cut to be made,
a cam rotatably mounted on said head,
a part on said slide movable into engagement with said cam to control the extent of movement of the tool to the work,
means for turning said cam into different positions for successively increasing the depth of cut made by the tool on the workpiece, including
a ratchet wheel rigidly connected with said cam,
and pawl means for turning said ratchet wheel for presenting different portions of the cam for engagement by said slide,
a spring for returning said cam and ratchet wheel to a starting position after completing the cutting of a thread,
a dial mounted concentric with said cam and ratchet wheel and having a projection extending toward said ratchet wheel,
said ratchet wheel having a plurality of holes therein arranged about the axis of said ratchet wheel and spaced apart circumferentially, and into any of which said projection of said dial may enter to determine the number of passes to be made by said tool, a shutoff pin also mounted on said dial, a member engaged by said shutoff pin when said ratchet wheel has been turned to the extent necessary to produce the desired number of passes, and means actuated by said member to move said pawl, means out of engagement with said ratchet wheel.

9. A threading mechanism according to claim 8, and including stop means for limiting the return movement of said ratchet wheel by said spring.

10. A threading mechanism according to claim 8 in which said pawl disengaging means comprises a bar slidable on said head against spring action when engaged by said shutoff pin, and a second bar normally interlocked with said first mentioned bar and released by spring action when said first mentioned bar is moved by said shutoff pin, said second bar being spring urged into a position to engage said pawl means to move the same out of engagement with said ratchet wheel.

11. A threading mechanism according to claim 10 and including a normally closed electric switch which is moved into circuit opening position when said first bar is moved by said shutoff pin, said circuit when open stopping the operation of said threading mechanism.

12. A threading mechanism according to claim 11 and including a knob on the outer end of said second bar by means of which said second bar may be pulled against said spring action into position for permitting the return of said first bar into its initial position for starting the operation of the threading mechanism.

13. A threading mechanism for attachment to a lathe having a headstock and a spindle, said mechanism for cutting internal threads including a bar mounted on said lathe and extending parallel to said spindle, a housing in which said bar is turnable and slidable, mechanism on said housing for controlling the length of movement of said bar lengthwise of the work in accordance with the length of the thread desired, a head mounted on said bar and which carries an internal thread-cutting tool, means on said head for varying the extent of movement of said cutting tool into the work to control the depth of cut to be made by said tool, and adjustable means for limiting the movement of said cutting tool in the opposite direction to clear the internal cut which has been made.

References Cited in the file of this patent

UNITED STATES PATENTS

| | | |
|---|---|---|
| 302,239 | Clause | July 22, 1884 |
| 502,517 | Hartness | Aug. 1, 1893 |
| 2,176,676 | Lupe | Oct. 17, 1939 |
| 2,581,082 | Drissner et al. | Jan. 1, 1952 |
| 2,903,933 | Mackenzie | Sept. 15, 1959 |
| 3,026,549 | Hartshorn | Mar. 27, 1962 |
| 3,066,330 | Howe et al. | Dec. 4, 1962 |
| 3,087,365 | Rose et al. | Apr. 30, 1963 |

FOREIGN PATENTS

| | | |
|---|---|---|
| 6,687 | Great Britain | Mar. 30, 1893 |